United States Patent
Carceroni et al.

(10) Patent No.: US 8,903,130 B1
(45) Date of Patent: Dec. 2, 2014

(54) VIRTUAL CAMERA OPERATOR

(75) Inventors: Rodrigo Carceroni, Mountain View, CA (US); Wei Hua, Mountainview, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/467,442

(22) Filed: May 9, 2012

Related U.S. Application Data (60) Provisional application No. 61/484,123, filed on May 9, 2011.

(51) Int. Cl.
*G06K 9/36* (2006.01)

(52) U.S. Cl.
USPC ............ 382/103; 382/107; 382/118; 382/173

(58) Field of Classification Search
CPC .................................................. G06K 9/00315
See application file for complete search history.

(56) References Cited

U.S. PATENT DOCUMENTS

| | | | |
|---|---|---|---|
| 5,596,362 A * | 1/1997 | Zhou | 348/14.01 |
| 5,715,325 A * | 2/1998 | Bang et al. | 382/118 |
| 6,778,252 B2 | 8/2004 | Moulton et al. | |
| 7,027,083 B2 | 4/2006 | Kanade et al. | |
| 7,302,086 B2 * | 11/2007 | Funayama | 382/115 |
| 7,606,444 B1 | 10/2009 | Erol et al. | |
| 2009/0222388 A1 | 9/2009 | Hua et al. | |
| 2010/0296706 A1 * | 11/2010 | Kaneda et al. | 382/118 |
| 2012/0106806 A1 * | 5/2012 | Folta et al. | 382/118 |

OTHER PUBLICATIONS

Rui et al., "Viewing Meetings Captured by an Omni-Directional Camera", Published in Proceedings of SIGCHI Conference of Human Factors, pp. 450-457, ACM, 2001 (cover sheet plus 8 sheets total).*

Sun et al., Recording the Region of Interest From FLYCAM Panoramic Video, IEEE Publication, 2001, pp. 409-412.*

\* cited by examiner

*Primary Examiner* — Brian P Werner (74) *Attorney, Agent, or Firm* — Morris & Kamlay LLP (57) ABSTRACT

A method and apparatus for virtual camera operation is disclosed. Virtual camera operation may include identifying potential subjects of a video stream by identifying faces of participants in the input video stream. Virtual camera operation may include determining a speaking state of each participant in the input video stream based on their respective identified face. Virtual camera operation may include identifying a subject of the input video stream based on the speaking state. Virtual camera operation may include generating, using a processor, an output video stream including a portion of the input video stream based on the subject.

24 Claims, 7 Drawing Sheets

VIRTUAL CAMERA OPERATOR

CROSS-REFERENCE TO RELATED APPLICATION

This patent application is a non-provisional utility patent application which claims the benefit of U.S. provisional patent application Ser. No. 61/484,123 filed on May 9, 2011, which is hereby incorporated by reference in its entirety.

TECHNICAL FIELD

This application relates to video production and digital communication.

BACKGROUND

In videography, human camera operators may attempt to provide an optimized visual experience to their viewing audience. In video, providing an optimized visual experience can include adjusting the scope of the content included in the video to focus a viewer's attention to what is considered important. A human camera operator can capture adjust the scope of the content included in the video by manually operating the video camera. The manual operation of the camera can include controlling the camera to change from one subject to another in a larger scene. For example, a human camera operator can control the camera to perform cuts, pans, zooms, or tilts.

For example, a scene may include interview between an interviewer and an interviewee. The interviewer may begin speaking and the human camera operator may control the camera to limit the scope of the content included in the video to a region surrounding the interviewer's face. The interviewer may stop speaking, the interviewee may begin speaking, and the human camera operator may control the camera to limit the scope of the content included in the video to a region surrounding the interviewee's face.

SUMMARY

Disclosed herein are aspects of systems, methods, and apparatuses for virtual camera operation of a video signal.

One aspect is a method for virtual camera operation of a video signal. Virtual camera operation may include identifying potential subjects of a video stream by identifying faces of participants in the input video stream. Virtual camera operation may include determining a speaking state of each participant in the input video stream based on their respective identified face. Virtual camera operation may include identifying a subject of the input video stream based on the speaking state. Virtual camera operation may include generating, using a processor, an output video stream including a portion of the input video stream based on the subject.

Another aspect is an apparatus for virtual camera operation of a video signal. The apparatus comprises a memory and at least one processor configured to execute instructions stored in the memory to perform virtual camera operation by identifying potential subjects of a video stream, which may include identifying faces of participants in the input video stream. The apparatus may perform virtual camera operation by determining a speaking state of each participant in the input video stream based on their respective identified face. The apparatus may perform virtual camera operation by identifying a subject of the input video stream based on the speaking state. The apparatus may perform virtual camera operation by generating an output video stream including a portion of the input video stream based on the subject.

Variations in these and other aspects will be described in additional detail hereafter.

BRIEF DESCRIPTION OF THE DRAWINGS

The various features, advantages and other uses of the present apparatus will become more apparent by referring to the following detailed description and drawing in which.

DETAILED DESCRIPTION

In video production and digital communication, adjustments to the scope of content included in a video can be used to optimize the experience of viewing the resultant video. A human camera operator can control a video camera to make adjustments to the scope of the content included in a video. However, a human camera operator may be unavailable or may be incapable of optimizing the visual experience by controlling the camera. Accordingly, implementations of a virtual camera operator are disclosed for automatically adjusting the content included in a video without human intervention. The virtual camera operator can operate, in real-time, on video streams acquired by cameras with no a priori human intent of creating such video adjustments.

The content captured by a video camera may be referred to as a scene. For example, a scene may include one or more participants, such as an interviewer and an interviewee. The scene may be captured by the video camera as an input video stream. The input video stream may include data, such as a series of frames. Each frame may include a matrix of pixels. Each frame may represent an image of the scene. The number of frames captured during a period of time may be referred to as the frame-rate. For example, a video camera may capture a scene at a frame rate of 30 frames per second (30 fps).

The virtual camera operator may control a virtual camera to create an output video stream based on the input video stream. At any given time, the output video stream may include the scene, or a portion of the scene including an area of interest, such as an area around the face of an actively speaking participant, which may be referred to as an active region, a focus-of-attention (FOA) region, or a subject. For example, at a point in time the scene may be the subject and the virtual camera may include substantially all of the content captured by the video camera, which may include the interviewer and the interviewee, in the output video stream. At another point in time the interviewer may be the subject and the virtual camera may include an area of the scene around the face of the interviewer. At another point in time the interviewee may be the subject and the virtual camera may include an area of the scene around the face of the interviewee.

A change of subject, such as from the face of an interviewer to the face of an interviewee, may be referred to as a transition. For example, transitions can include cuts, pans, tilts, or zooms. A transition may include an autonomous physical or virtual (simulated) change in the output video stream. For example, a physical transition may include physically adjusting a focal length or angle of a camera or alternating between multiple physical cameras; a virtual transition may include simulating a physical transition from one subject to another in the output video stream without physically changing the scope of the content captured by the video camera in the input video stream.

Implementations of a virtual camera operator may include using face detection and face tracking to enumerate participants (potential subjects) in a scene and to identify locations (landmarks) of facial elements, such as eyes and lips, of each potential subject. For each potential subject, the virtual camera operator may analyze relative motion of the facial elements, such as lip motion, in order to determine a speaking state for each of the potential subjects. The speaking state can indicate whether that potential subject is speaking. The virtual camera operator may determine whether to transition from one subject to another based on the speaking states of the participants in the scene. The virtual camera operator may use the current speaking state of each potential subject, such as the speaking state in a frame or sequence of frames, to determining whether to transition. In addition, or in the alternative, the virtual camera operator may use data indicating potential subjects, associated landmark and tracking information, associated speaking state information, or combination thereof, which may be gathered over time, such as over the course of the video.

Figure 1:
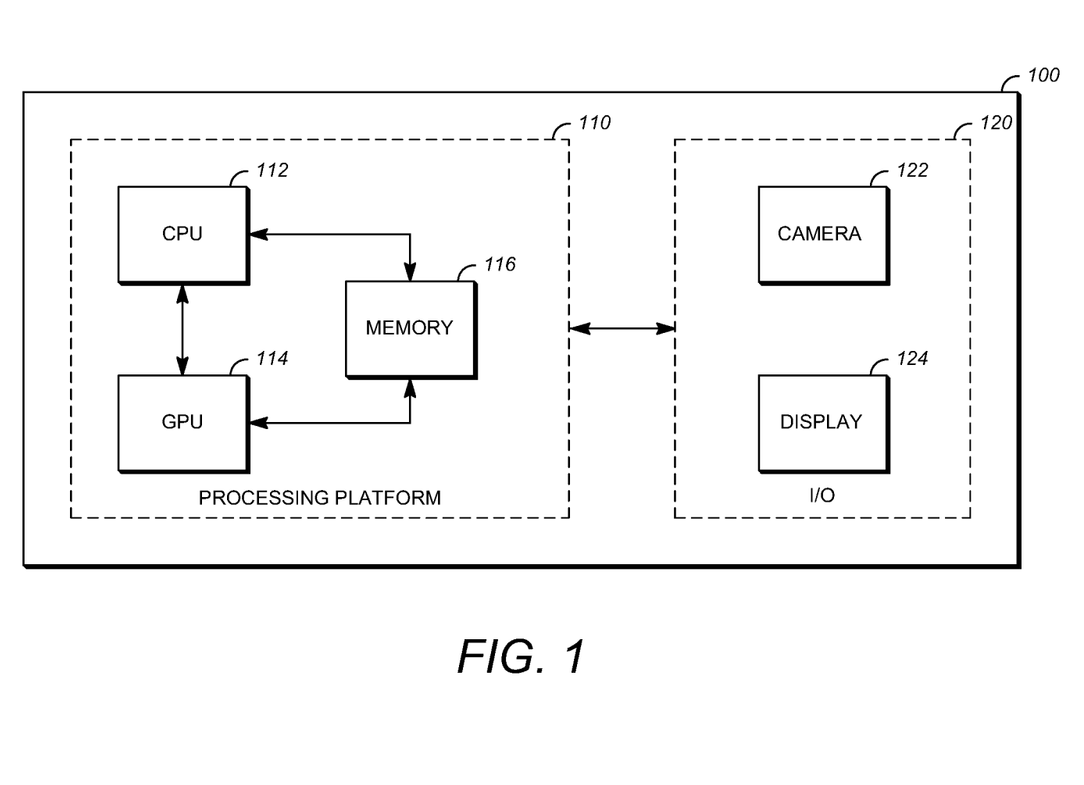
FIG. 1 is a block diagram of a device implementing a virtual camera operator in accordance with an implementation of this disclosure.

FIG. 1 is a block diagram of a device 100 for implementing a virtual camera operator in accordance with an implementation of this disclosure. Device 100 may include a processing unit 110, an input/output (I/O) unit 120, or both. As used herein, the term "computing device" includes a server, a hand-held device, a laptop computer, a desktop computer, a special purpose computer, a general purpose computer, or any device, or combination of devices, capable of performing any method, or any portion thereof, disclosed herein. The device 100 may be a stationary device or a mobile device. The device 100 may capable of performing video-conferencing, video-recording telecasting, or any other desired or required video application function. Elements of the device 100, such as the processing unit 110 and the I/O unit 120, may be implemented as hardware, such as circuitry, software, or as a combination of hardware and software. Although not shown in FIG. 1, the device 100 may include other suitable elements, such as a global positioning system (GPS) unit.

The processing unit 110 may include a central processing unit (CPU) 112, a graphical processing unit (GPU) 114, a memory 116, or any combination of a CPU, a GPU, or a memory. For example, the CPU 112 can be a controller for controlling the operations of the device 100. The CPU 112 may be in communication with the memory 116 using, for example, a memory bus. The memory 116 may be random access memory (RAM), read only memory (ROM), or any other suitable memory. The memory 116 may store data, program instructions, or both, which may be used by the CPU 112. The GPU 114 may be configured for relatively efficient processing of video and image data. The GPU 114 may be implemented on a video card of device 100 and may communicate with the CPU 112, the memory 116, or both. Although shown separately, the CPU 112 and the GPU 114 may be combined. The processing unit 110 may communicate with the I/O unit 120. Although not shown in FIG. 1, the processing unit 110 may include other suitable elements.

The I/O unit 120 may include a video capture unit (camera) 122, a display 124, or both. The camera 122 can be any device capable of capturing a video stream. The display 124 can be any device capable of displaying video. Display 124 may be implemented, for example, as a liquid crystal display (LCD), a cathode-ray tube (CRT), or a light emitting diode display (LED), such as an OLED display. Although not shown in FIG. 1, the I/O unit 120 may include other suitable elements, such as a user input unit.

Other implementations of the device 100 are may be used for implementing the virtual camera operator. For example, the camera 122, the display 124, or both, may be external to the device 100 and may communicate with the device 100. The camera 122 may transmit a video stream to the device 100. The display 124 may receive video transmitted by the device 100. For example, the device 100 may communicate with the camera 122, the display 124, or both, using a network, such as a local area network (LAN), wide area network (WAN), virtual private network (VPN), a mobile or cellular telephone network, or any other means of communicating a video stream between the device 100 and the camera 122, the display 124, or both. In an implementation, communication of a video stream may include using a transport protocol, such as real-time transport protocol (RTP), Hyper Text Transport Protocol (HTTP), or any other video streaming protocol.

FIGS. 2-7 show diagrams of a virtual camera operator, and elements thereof, for processing a video stream. Although FIGS. 2-7 are described with reference to discrete time periods for clarity, the virtual camera operator may receive the video stream as a single data unit including a series of frames, or as a series of data units, each including one or more frames or parts of frames.

Figure 2:
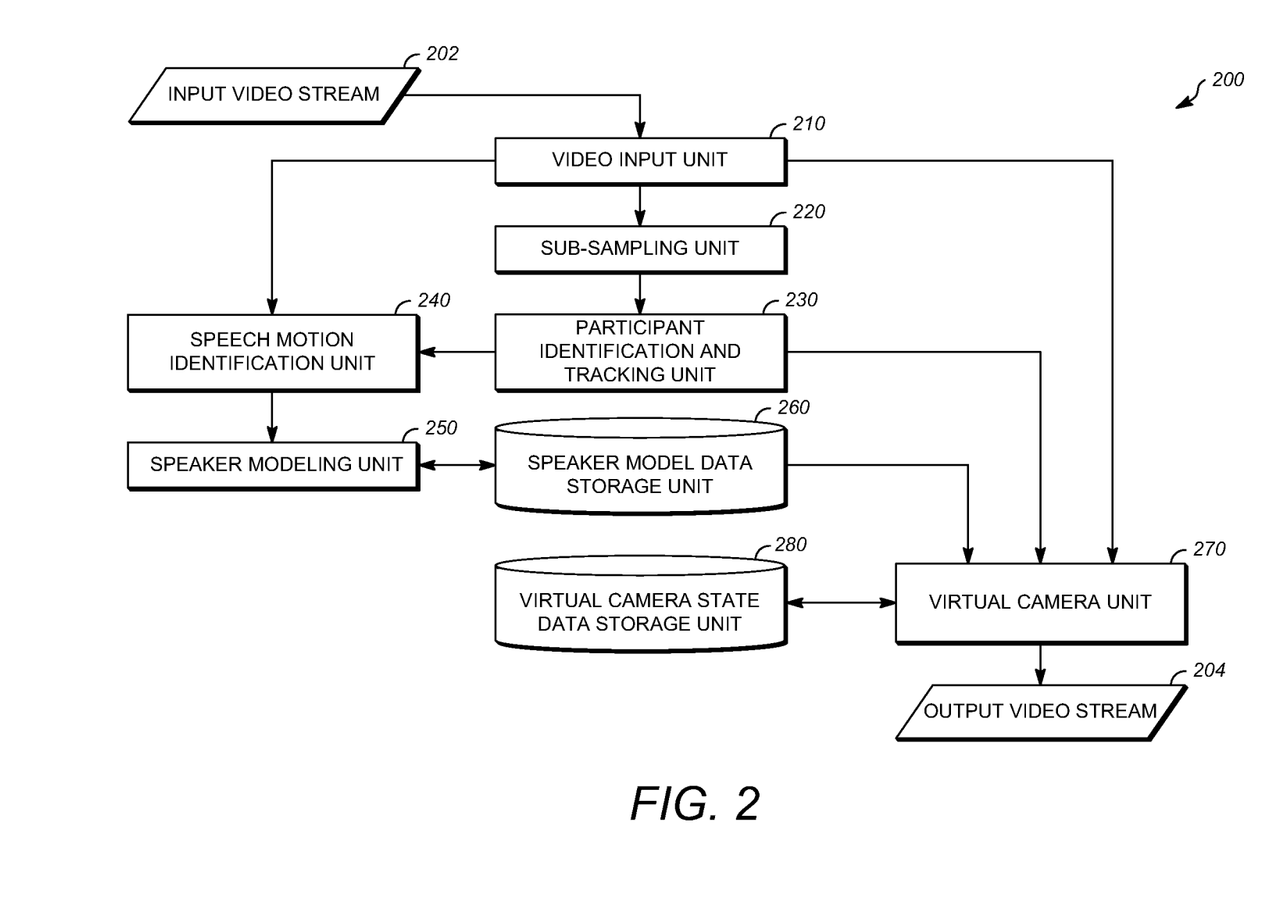
FIG. 2 is a diagram of virtual camera operator in accordance with an implementation of this disclosure.

FIG. 2 is a diagram of a virtual camera operator 200 in accordance with an implementation of this disclosure. The virtual camera operator 200 may receive an input video stream 202 and may generate an output video stream 204. Implementations of the video camera operator 200 may include a video input unit 210, a sub-sampling unit 220, a participant identification and tracking unit 230, a speech motion identification unit 240, a speaker modeling unit 250, a speaker model data storage unit 260, a virtual camera unit 270, a virtual camera state data storage unit 280, or a combination thereof. In an implementation, the device 100 shown in FIG. 1 may implement the virtual camera operator 200. For example, the GPU 114 may implement the video input unit 210, the sub-sampling unit 220, and the speech motion identification unit 240; the CPU 112 may implement the participant identification and tracking unit 230, the speaker modeling unit 250, and the virtual camera unit 270; and the memory 116 may implement the speaker model data storage unit 260 and the virtual camera state data storage unit 280.

The video input unit 210 may receive an input video stream 202 including a scene. For example, the video input unit 210 may receive the input video stream 202 from a video capture unit, such as the camera 122 shown in FIG. 1. The video input stream may include one or more frames, such as a sequential series of frames. For example, a camera may capture 10 minutes of video at 30 frames per second, and the video stream may include 18000 frames. The input video unit 210 may receive the input video stream 202 in a single unit including 18000 frames. The input video unit 210 may receive the input video stream 202 in multiple units, such that a unit may include multiple frames, a single frame, or a part of a frame.

Although the virtual camera operator 200 is described herein as processing video in real-time, or near real-time, the input video stream 202 may include a prerecorded video.

The virtual camera operator 200 may process the input video stream 202 using block based processing, wherein the input video stream can be processed as a series of sequential blocks of frames. The number of frames in each block may be a predetermined value, such as an empirically identified value, or may be determined based on operating conditions, such as the resolution of the input video stream and bandwidth requirements. The virtual camera operator 200 may process the input video stream 202 using sliding window based processing, wherein a current frame can be processed with reference to a number of frames sequentially before and after the current frame. The number of frames in the window may be a predetermined value, such as an empirically identified value, or may be determined based on operating conditions, such as the resolution of the input video stream and bandwidth requirements.

The virtual camera operator 200 may process the input video stream 202 using a combination of block based processing and sliding window based processing, wherein a current block of frames can be processed with reference to a number of frames sequentially before and after the current block of frames. The number of frames in the window may be a predetermined value, such as an empirically identified value, or may be determined based on operating conditions, such as the resolution of the input video stream and bandwidth requirements. In an implementation the virtual camera operator 200 may be implemented as a pipeline. For example, the virtual camera operator 200 may process a series of frames such that, for example, the virtual camera unit 270 may processes a first frame and the participant identification and tracking unit 230 may concurrently process a second frame.

The input video stream 202 may be converted to a target color format, such as RGBA, YUV, or HSL. For example, the input video stream 202 may include a series of frames and each frame may be color-converted from an input color format, such as a color format used by the camera 122, to the target color format to generate a color-converted video stream. In an implementation, the video input unit 210 may receive the input video stream 202 in the target color format and color conversion may be omitted.

The sub-sampling unit 206 may receive the video stream, which may be the color-converted video stream, from the video input unit 210 and may generate a lower resolution video stream, such as a half resolution video stream. For example, the sub-sampling unit 206 may generate the lower resolution video stream by sub-sampling the video stream. For example, a frame may include pixels in a matrix, such as in a 320×240 matrix of pixels, and the sub-sampling may generate a sub-sampled frame including a 160×120 matrix of pixels. In an implementation, a frame may be a texture, and the sub-sampling unit 206 may generate a subsampled texture. Subject identification and tracking using the lower resolution video stream may be more efficient than using the input video stream 202.

The participant identification and tracking unit 230 may receive the video stream, which may be the lower resolution video stream, and may identify and track potential subjects in the video stream. For example, the participant identification and tracking unit 230 may identify and track the face of each participant in the scene using a frame of the lower resolution video stream. Although the participant identification and tracking unit 230 is shown as a single unit, multiple units may be used. For example, participant identification may be performed by a unit and participant tracking may be performed by another unit. As used herein, the terms 'potential subject' and 'participant' include any element of a video stream capable of being recognized as including a facial feature (landmark), such as an eye, a mouth, or lips. For example, a potential subject may be a human face, an animal face, or a puppet face.

The participant identification and tracking unit 230 may generate identification and landmarking data for the participants. Generating the identification and landmarking data may include assigning an identifier (Face Id), which may be a unique and temporally-coherent numeric value, to each identified participant. In an implementation, participant identification and tracking unit 230 may determine whether an identified face is associated with a previously assigned face ID, such as a face ID assigned with respect to a previous frame, and may use the previously assigned face ID as the identifier for the participant. Generating the identification and landmarking data may include identifying, for each potential subject in the scene, an area of a frame, such as an elliptical area, that may include the face of the respective potential subject. For example, a scene may include one or more potential subjects, such as an interviewer and an interviewee, and, for each potential subject, information, such as frame coordinates indicating an area of the frame including the face of the respective potential subject, may be generated.

Generating the identification and landmarking data may include determining facial features (landmarks) for each participant. For example, the identified facial landmarks may include eyes, a mouth, lips, a nose, eyebrows, ears, or a combination thereof. The facial landmarks may be indicated, for example, using image coordinates. For example, a frame may include a matrix of pixels and the image coordinates may include Cartesian coordinates within the frame matrix. Any other means of identifying a location an element within the video steam may be used.

In an implementation, generating the identification and landmarking data may be relatively computationally intensive and may be performed at a frequency other than the frame rate of the video stream. For example, the identification and landmarking data may be generated in a separate thread at a frequency that is lower than the frame rate of the video stream. For example, the frame rate of the video stream may be 30 frames per second and the identification and landmarking data may be generated for every 30th frame (once per second). In an implementation, the identification and landmarking data may be generated by a separate unit, which may operate at a different frequency than the frame rate of the video stream.

The participant identification and tracking unit 230 may generate motion tracking data. Motion tracking data may indicate inter-frame motion for identified participants and for facial landmarks of the identified participants. Generating motion tracking data may include using visual template tracking, optical-flow-based feature tracking, or a combination of visual template tracking and optical-flow-based feature tracking to track motion of the detected participant and associated facial landmarks. Motion tracking data may be generated at a specified frame rate, such as the frame rate of the video stream. For example, motion tracking data may be generated for each frame in the video stream.

The participant identification and tracking unit 230 may synchronize the identification and landmarking data with the motion tracking data. For example, the participant identification and tracking unit 230 may generate identification and landmarking data for a first frame in a video stream. In an implementation, the participant identification and tracking unit 230 may generate identification and landmarking data in a separate thread at a rate that is lower than a frame rate of the video stream. The participant identification and tracking unit 230 may generate motion tracking data for each frame in the video stream. The identification and landmarking data may be generated in parallel with the motion tracking data at a rate that is greater than the rate at which the identification and landmarking data is generated, such as at the frame rate of the video stream. The participant identification and tracking unit 230 may identify differences between the motion tracking data and the identification and landmarking data. For example, the identification and landmarking data may be generated at 1/5 the frame rate, and the motion tracking data for frames 1-5 may be applied to the identification and landmarking data identified for frame 1 to minimize tracking discontinuities.

Figure 3:
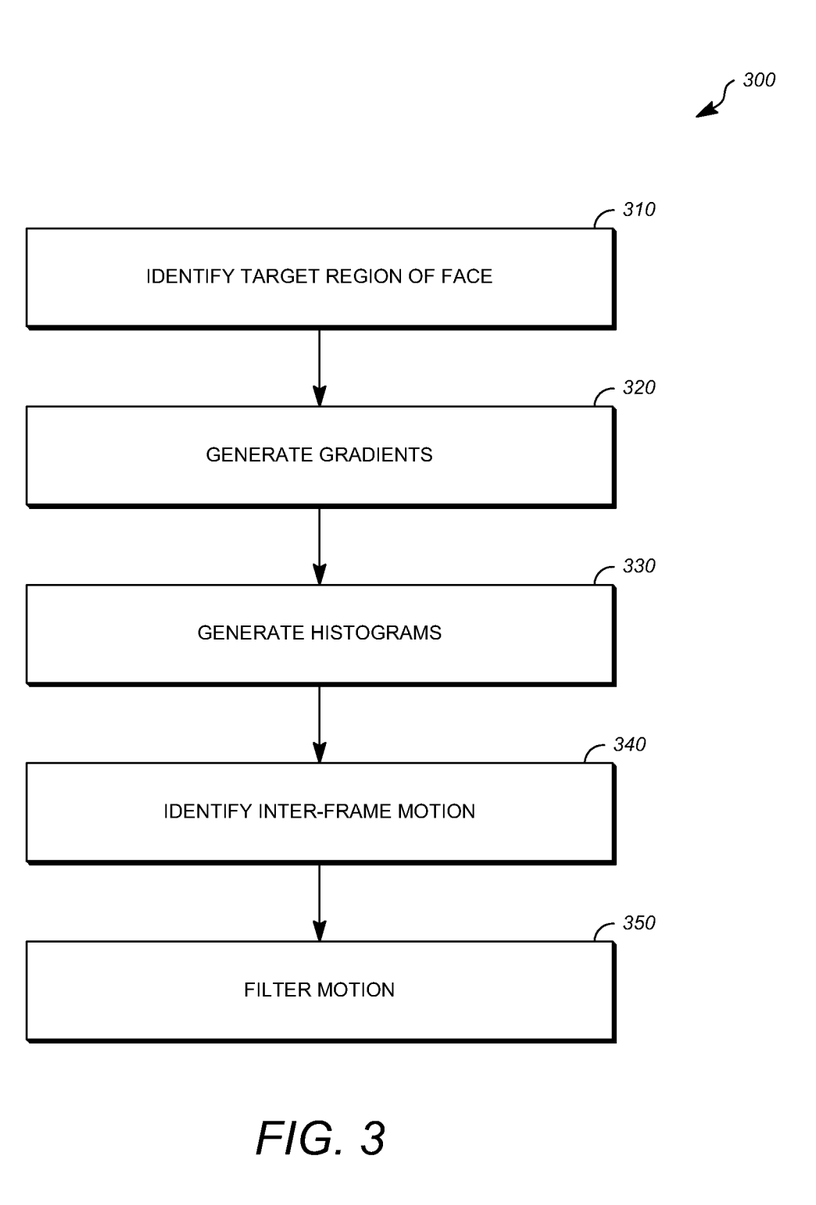
FIG. 3 is a flowchart of speech motion identification in accordance with an implementation of this disclosure.

The speech motion identification unit 240 may receive the video stream, which may be the color-converted video stream, and may receive the identification, landmarking, and motion tracking data. The speech motion identification unit 240 may identify speech motion data associated with each respective potential subject in the scene. Identifying the speech motion data may include identifying a target region of the potential subject, such as a lip region of a face, and obtaining measurements of motion within the target region, such as lip motion, as shown in FIG. 3.

In an implementation, a speaking state determination may be made for each participant based on the speech motion data. Alternatively, or additionally, the speaking state determination may include using speaker modeling. Speaker modeling may be used to improve the accuracy of determining whether a participant is speaking. The accuracy of determining whether a participant is speaking may be affected by the speaking characteristics of the participant. In an implementation, the speaking characteristics may include participant specific variations in motion magnitude, average magnitude, temporal variance, and frequency. For example, during speech, elements within a target region of a potential subject, such as lips, may exhibit periods of low or no motion, such as when speaker hesitates in the midst of speaking. Further, the magnitude and frequency of motion associated with one participant may differ from the magnitude and frequency of another participant.

Figure 4:
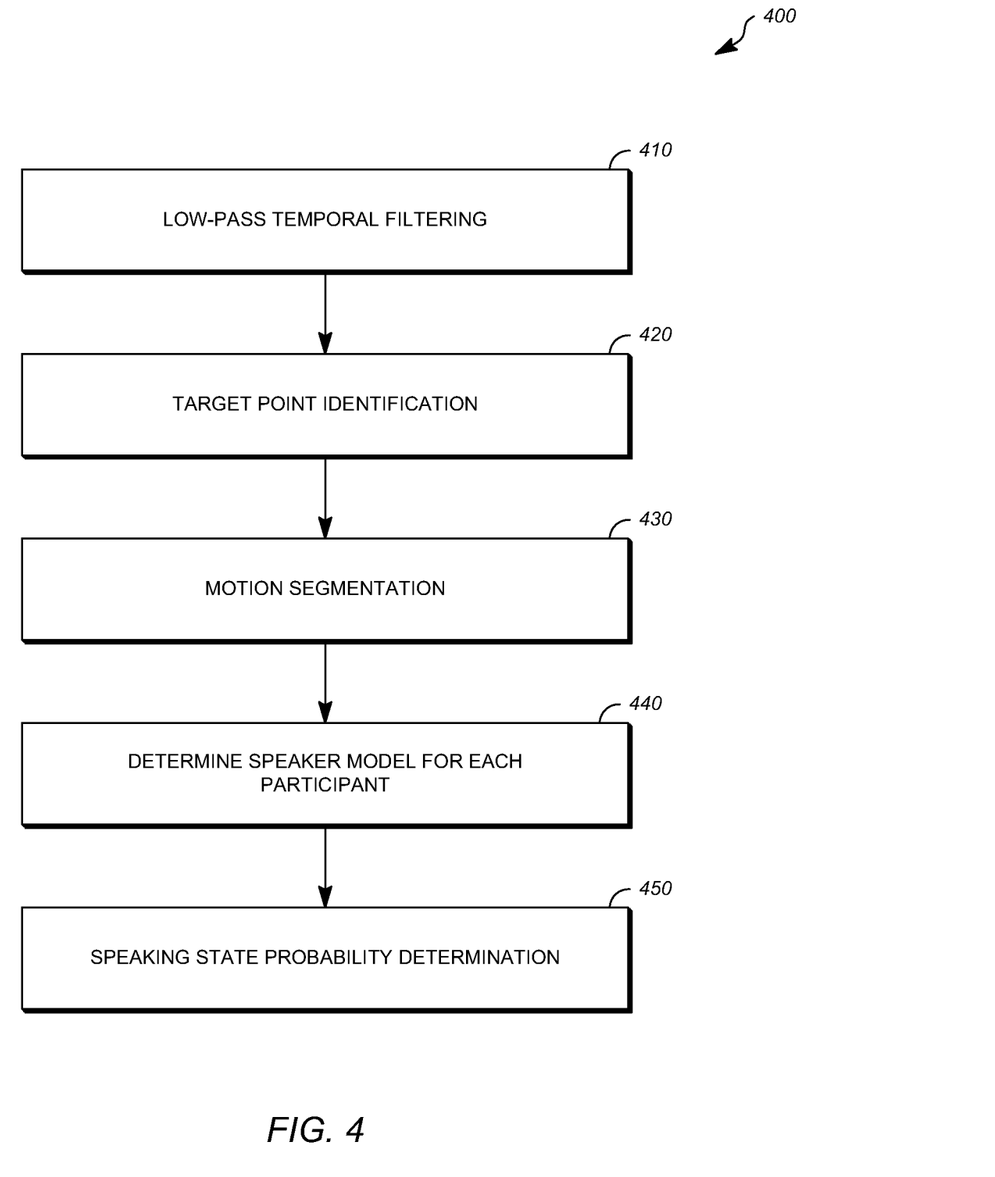
FIG. 4 is a flowchart of speaker modeling in accordance with an implementation of this disclosure.

The speaker modeling unit 250 may receive the speech motion data, may construct a speaker model for each potential subject. In an implementation, the speaker modeling unit 250 may receive a previously generated speaker model for a potential subject. For example, the speaker modeling unit 250 may receive a speaker model from the speaker model data storage unit 260. The speaker modeling unit 250 may use the speaker model in conjunction with the speech motion data to determine a speaking-state probability for each potential subject, and may determine a speaking state, such as speaking or not speaking, for each participant in the scene based on the respective speaking-state probability, as shown in FIG. 4.

In an implementation, the virtual camera operator 200 may determine the speaking state for one or more participants without using speaker modeling. For example, the speaker modeling unit 250 may be omitted or the speaker model for a participant may be incomplete, and the virtual camera operator 200 may determine the speaking state of a participant based on the speech motion data. In an implementation, the speaking state determination for a participant may include a comparison with the speaking state, or speech motion data, associated with other participants. For example, speech motion data may be identified for multiple potential subjects, and the potential subject exhibiting the greatest motion magnitude, greatest motion frequency, or both may be identified as having a speaking state of speaking and other potential subjects may be identified as having a speaking state of not speaking. Other metrics for identifying a speaking state may be used.

The speaker modeling unit 250 may store the speaker models in the speaker model data storage unit 260. For example, for a current frame in a video stream, the speaker modeling unit 250 may receive speech motion data for a participant in the scene. The speaker modeling unit 250 may retrieve a speaker model associated with the participant from the speaker model data storage unit 260. The speaker modeling unit 250 may update the speaker model based on the speech motion data, may determine a speaking state for the participant, and may store the updated speaker model in the speaker model data storage unit 260.

The virtual camera unit 270 may receive the video stream, which may be the color-converted video stream 202, the participant identification and motion tracking data, the speaker models, which may include speaking state history information for each participant, or a combination thereof. The virtual camera unit 270 may receive camera state information from the virtual camera state data storage unit 280. For example, the camera state information may indicate that the current subject of the virtual camera is the scene or that the current subject of the virtual camera includes an area around a participant in the scene.

The virtual camera unit 270 may identify a subject of the scene and may identify a transition from one subject to another. For example, the scene may include two potential subjects, such as an interviewer and an interviewee. The camera state information, or a lack thereof, may indicate that the current subject is the scene, including the participants. The speaker models and motion tracking data may indicate that a participant, such as the interviewer, is speaking and the virtual camera unit 270 may identify an active region around the speaking participant as the subject.

The virtual camera unit 270 may identify a transition, or a combination of transitions, to use to adjust the output of the virtual camera. For example, the output of the virtual camera may be transitioned from one subject to another, such as from the scene, including both participants, to another subject, including the active region around the speaking participant. For example, the transition may include panning the camera and zooming the camera. The virtual camera unit 270 may store the updated camera state information, indicating the current subject, in the virtual camera state data storage unit 280.

The subject identification and transition determination may be based on criteria, such as activity constraints, temporal constraints, or combination constraints. For example, the current subject may be an actively speaking participant, and an activity constraint may prevent a change in subject until the speaking state of the participant changes to not speaking. In an example, a temporal constraint may limit the frequency of subject changes such that a subject will be maintained for a period of time, which may be a predetermined period, before a transition to another subject. In another example, the data may indicate that none of the participants in the scene are actively speaking and an activity constraint may indicate a transition of the subject to include the scene, including the participants. Additional, or alternative, criteria may be used. For example, a combination constraint may indicate a threshold frequency of change of actively speaking participants, or a threshold number of actively speaking participants, above which the subject may be transitioned to include the scene, including the participants.

In an implementation, the transitions may be applied to the output video stream 204 over the course of multiple frames, and the virtual camera unit 270 may identify the number of frames. For example, the transition, which may be a geometric transition, may include applying an interpolation, which may be linear or non-linear, between a rectangular bounding box around one subject and a rectangular bounding box around another subject to generate a visual effect similar to an effect produced by a human camera operator. In an implementation, the virtual camera unit 270 may up-sample the subject region to generate the output video stream 204 at a target resolution. For example, the output video stream 204 may be generated at an identified resolution or at a resolution that is equivalent to the resolution of the input video stream.

The virtual camera operator 200 may store, transmit, or store and transmit the output video stream 204. For example, the virtual camera operator 200 may send the output video stream 204 to a display unit, such as the display unit 124 shown in FIG. 1, and the display unit may render the output video stream 204.

FIG. 3 is a flowchart of speech motion identification 300 in accordance with an implementation of this disclosure. As shown in FIG. 2, the virtual camera operator 200 may perform speech motion identification 300 using, for example, the speech motion identification unit 240. Implementations of speech motion identification 300 may include identifying a target region of a face of a potential subject at 310, generating gradients at 320, generating histograms at 330, identifying inter-frame motion values at 340, filtering the motion at 350, or a combination thereof.

A target region of a face of a potential subject may be identified at 310. Identifying a target region of a face of a potential subject may include using facial landmark information, such as information indicating coordinates of the eyes and information indicating coordinates of a center of the mouth. A value dh indicating a vector from a position of a first eye, such as a left eye, to a position of a second eye, such as a right eye, can be determined. A value dv indicating a vector from a centroid of the eyes to a center of the mouth can be identified. Other facial landmarks may be used.

In an implementation, the target region of the face may be identified as an ellipsis. For example, the center of the ellipsis may be the mouth center, the major axis of the ellipsis may be parallel to dh, the length of the major axis of the ellipsis may be a function of the length of dh, and the length of the minor axis of the ellipsis may be a function of the length of dv. In an example, the length of the major axis of the ellipsis may be determined by multiplying the length of the dh by a value, which may be a predetermined value, such as an empirically identified value, and the length of the minor axis of the ellipsis may be determined my multiplying the length of the dv by another value, which may be a predetermined value, such as an empirically identified value.

Gradients may be generated at 320. A gradient may be associated with a pixel P within the target region and may indicate, for example, an orientation of a maximum variation of the intensity I around a pixel and the rate of variation of I along such orientation.

In an implementation, generating gradients may include generating spatial gradients based on the target region, using, for example, a spatial gradients shader. In an implementation, generating the spatial gradients may include sampling pixels in a frame. For example, a processor, such as the GPU 114 shown in FIG. 1, may be used to sample the pixels. In an implementation, sampling a pixel may include identifying one or more intensity values I for a pixel. An intensity value I may be associated with a color band C. For example, the color-converted video stream may be an RGBA video stream and each pixel P may be sampled to identify a red color band intensity value $I_R$, a green color band intensity value $I_G$, a blue color band intensity value $I_B$, and an alpha color band intensity value $I_A$.

Generating a spatial gradient may include determining a difference between intensity values of spatially proximate (neighboring) pixels within the target region. A color band intensity value $I_C(x,y)$ may indicate an intensity for color band C for pixel $P(x,y)$. For each pixel $P(x,y)$, for each color band C, a gradient vector $g_C(x,y)$ may be generated. Generating a color band gradient vector $g_C(x,y)$ may be expressed as the following:

$$g_C(x,y)=(I_C(x+1,y)-I_C(x,y),I_C(x,y+1)-I_C(x,y)). \quad \text{[Equation 1]}$$

A gradient vector $g_C(x,y)$ may have an orientation. For example, a gradient vector $g_C(x,y)$ may be generated based on a matrix of pixels around a target pixel $P(x,y)$, and a gradient vector $g_C(x,y)$ may be oriented from the top left to the bottom right such that in the color band C the intensity I of the pixels in the matrix of pixels increases from the top left pixel to the bottom right pixel, or the gradient vector $g_C(x,y)$ may be oriented from the bottom left to the top right such that in the color band C the intensity I of the pixels in the matrix of pixels increases from the bottom left pixel to the top right pixel.

A gradient $g(x,y)$ for a pixel $P(x,y)$ may be generated based on the color band gradient vectors $g_C(x,y)$ associated with the pixel $P(x,y)$. For example, orientation normalized gradient vectors may be generated may normalizing the orientation of the gradient vectors $g_C(x,y)$ such that a non-negative scalar product may be determined for each pair of gradient vectors $g_C(x,y)$. A weighted average of the normalized gradient vectors $g_C(x,y)$ may be determined using weights, such as the respective coefficients of each color band in the human perception of light intensity. Other color band weights may be used. For example, the weights may be based on empirically identified values other than the human perception of light intensity.

Histograms may be generated based on the gradients at 330. In an implementation, generating histograms may include accumulating the gradients to generate gradient-intensity-weighted histograms of gradient orientations and gradient positions. For example, generating the histograms may include identifying a rectangular bounding box around the target region such that the points (0,0), (0,1), (1,0), (1,1) correspond to the vertexes of the rectangular bounding box. The pixel coordinates may be converted (normalized) to coordinates within the rectangular bounding box. For example, a normalized pixel within the rectangular bounding box $P'(u,v)$ may correspond to a pixel $P(x,y)$ such that $u=(x-x0)/(x1-x0)$ and $v=(y-y0)/(y1-y0)$.

A histogram may be associated with a frame (image) or a portion of a frame, such as the target region and may indicate a gradient distribution of the pixels with the target region. In an implementation, generating a histogram may include categorizing the pixels into defined bins based on the range of possible gradient orientations or positions. For example, the bins of a histogram may be based on an indexing value, which may be a characteristic of the gradients, such as orientation or position, and the histogram may include a bin vote for each pixel, which may indicate a contribution of the pixel to the target region with respect to the indexing value. In an implementation, generating histograms for a target region may include generating an orientation histogram, a horizontal displacement histogram, a vertical displacement histogram, or a combination thereof.

An orientation histogram may be generated using the orientation of the gradients as the indexing value. For example, each pixel may vote on a bin defined by the orientation of the respective gradient vector g(x,y) and the weight of the vote may be the magnitude of the gradient vector g(x,y). A horizontal displacement histogram may be generated using the horizontal coordinate x of the pixels as the indexing value. For example, each pixel P(x,y) may vote on a bin defined by the horizontal coordinate x and the weight of the vote may be the magnitude of the gradient vector g(x,y). A vertical displacement histogram may be generated using the vertical coordinate y of the pixels as the indexing value. For example, each pixel P(x,y) may vote on a bin defined by the vertical coordinate y and the weight of the vote may be the magnitude of the gradient vector g(x,y).

Inter-frame motion values may be identified at 340. In an implementation, identification of inter-frame motion values may include applying a divergence metric to temporally-consecutive histograms to obtain the inter-frame motion value, which may be a real number and may correlate strongly with inter-frame motion in the target area.

For example, based on the orientation histograms of a target region at a first time t, which may correspond with a first frame, and a second time t+1, which may correspond with a second frame, a measurement of orientation change may be calculated by normalizing the histograms, such as by scaling the histograms to a unit norm, and computing the difference between the histograms using, for example, a symmetrized Kullback-Leibler (KL) divergence. Similarly, a symmetrized KL divergence, or other differentiation metric, may be used to obtain measurements of change for the horizontal and vertical displacement histograms. The Inter-frame motion value, which may indicate inter-frame motion within the target region of a face, may be determined as a weighted average of the measurement of the orientation change, the measurement of the vertical displacement change, and the measurement of the horizontal displacement change. The measurements may be weighted based on values, such as predefined weights. In an implementation, inter-frame motion values may be identified for a target region over a series of frames.

Motion filtering may be performed at 350. Motion filtering can include applying a robust filter to the target region inter-frame motion values for each potential subject. For example, the inter-frame motion values may be accumulated in, for example, a buffer, such as a fixed-capacity circular buffer, and a natural logarithm of the median of the inter-frame motion values in the buffer may be calculated. Motion filtering may reduce noise and improve the accuracy of speaker modeling and speaking state identification as shown in FIG. 4.

FIG. 4 is a flowchart of speaker modeling 400 in accordance with an implementation of this disclosure. Implementations of speaker modeling 400 may include low-pass temporal filtering at 410, target point identification at 420, motion segmentation at 430, speaker model determination at 440, speaking state probability determination at 450, or a combination thereof.

A low-pass temporal filter may be applied to the speech motion information at 410. For example, the speech motion information may include a natural logarithm of the median of buffered inter-frame motion value, such as the logarithm calculated at 350 above. In an implementation, speech motion information may be identified as shown in FIG. 3, and a low-pass temporal filter may be applied to the speech motion information to generate temporally-smooth motion information. For example, a weighted moving average of the inter-frame motion values may be computed using weights such that the weights decrease exponentially based on the age (temporal distance from a current frame) of the inter-frame motion values.

Target points may be identified at 420. In an implementation, the temporally-smooth motion information may include a series of motion measurements (points) and the target point identification may include identifying target points, such as minimum target points and maximum target points, in the temporally-smooth motion information. Local target points, indicating relative extremes within portions of the temporally-smooth motion information may be identified. Candidate target points, indicating relative extremes within the local target points, may be identified based on the local target points. Relevant target points, indicating alternating minimum and maximum extremes within the temporally-smooth motion information may be identified based on the candidate target points.

A local target point may indicate a point at a relative extreme within a set of K points in the temporally-smooth motion information. The number of points K in a set may be a predetermined value, such as an empirically identified value. A target point kind may indicate whether the target point is a minimum target point or a maximum target point. For example, a local minimum target point may be a point in the temporally-smooth motion information such that the K/2 points preceding the minimum target point and the K/2 points following the target point are greater than the target point. Similarly, a local maximum target point may be a point in the temporally-smooth motion information such that the K/2 points preceding the target point and the K/2 points following the target point are less than the target point.

In an implementation, a local target point may be identified as a candidate target point. For example, the first local target point identified for a video stream may be used as a candidate target point. The candidate target point may be updated based on another local target point. For example, a local target point may be compared with the candidate target point. The local target point may be the same kind of target point as the candidate target point, and the target point having a more extreme value may be used as the candidate target point. For example, a first local minimum target point may be identified and used as the candidate target point. A second local minimum target point may be identified and may be lower than the candidate target point. The second local minimum target point may be used as the candidate target point.

A relevant target point may be identified based on the candidate target point and a local target point. For example, the local target point may not be the same kind of target point as the candidate target point. A difference between the local target point and the candidate target point may be greater than a relevance threshold, which may be a predetermined value, such as an empirically identified value. The candidate target point may be used as a relevant target point and the local target point may be used as the candidate target point. In another example, the difference may be less than the relevance threshold and the local target point may not be used. One or more relevant target points, which may indicate alternating minimum and maximum points in the temporally-smooth motion information, may be identified.

The speech motion information may be segmented at 430. In an implementation, the speech motion information may be segmented into peak regions, trough regions, and transition regions based on the target points. In an implementation, the low pass filtering may introduce delay into the temporally smooth speech motion information. To compensate for the delay, the segmentation may include shifting the temporal coordinates of the relevant target points backward to align with the unfiltered speech motion information.

In an implementation the segmentation may include segmenting the speech motion information into temporal regions delimited by consecutive relevant target points. For example, a first temporal region may include the speech motion information between a relevant minimum target point and a subsequent relevant maximum target point, and a second temporal region may include the speech motion information between the relevant maximum target point and a subsequent relevant minimum target point. Trough regions, peak regions, and transition regions may be identified in each temporal region.

A trough region may include, for example, measurements (points) in the temporal region of the speech motion information such that the difference between the points and the relevant minimum target point is less than a trough threshold. The trough threshold may be a proportion of the difference between the relevant minimum target point and the relevant maximum target point. The proportion may be a predetermined value, such as an empirically identified value.

A peak region may include, for example, points such that the difference between the points and the relevant maximum target point is less than a peak threshold. The peak threshold may be a proportion of the difference between the relevant minimum target point and the relevant maximum target point. The proportion may be a predetermined value, such as an empirically identified value.

A transition region may include, for example, points (motion values) such that the difference between the motion values and the relevant minimum target point is greater than the trough threshold and the difference between the motion values and the relevant maximum target point is greater than the peak threshold.

Although the peak threshold and target threshold are described as proportions of the difference between the relevant minimum target point and the relevant maximum target point, other method of identifying peak regions, transition regions, and trough regions may be used.

A speaker model may be determined for each potential subject at 440. In an implementation, the speaker model determination may include accumulating (calculating) an average and a standard deviation of the motion values in the trough region, and accumulating an average and a standard deviation of the motion values in the peak region. The speaker model values (trough average, trough standard deviation, peak average, and peak standard deviation) may be associated with the potential subject. For example, the speaker model values and the face ID associated with the potential subject may be stored in a memory, such as the speaker model data storage unit 260 shown in FIG. 2, as the speaker model for the participant. In an implementation, the speaker model may include other information, such as a history of the speaking state of the participant, landmarking information of the face of the participant, motion tracking information for the participant, or any other information associated with the participant.

A speaking state probability may be determined at 450. In an implementation, determining a speaking state may include converting the speech motion information into a speaking state probability. For example, the conversion may include using a probability estimation model, such as a Bayesian inference. The speaking state probabilities may be generated autonomously, without, for example, human identification of temporal regions.

For example, the speech motion values in the trough region and speech motion values in the peak region may be treated as Gaussian distributions such that each measurement in the speech motion information may be identified as being associated with the peak region Gaussian distribution or the trough region Gaussian distribution. For example, a probability metric, such as Bayes rule, may be used to determine the probability that a motion value is associated with the peak region. Using a probability metric, such as Bayes rule, may include using a uniform prior probability distribution to determine the probability that a motion value is associated with the peak region.

A speaking-state may be identified for each participant for each frame based on the probability that the motion value for the frame is associated with the peak region. For example, the probability may be greater than a speaking probability threshold, such as 0.5 or 0.7, and the speaking state for the participant for the frame, which may be referred to as the instantaneous speaking state, may be identified as speaking. The probability may be less than or equal to the speaking probability threshold, and the speaking state may be identified as not speaking. The speaking probability threshold may be a predetermined value, such as an empirically identified value.

Figure 5:
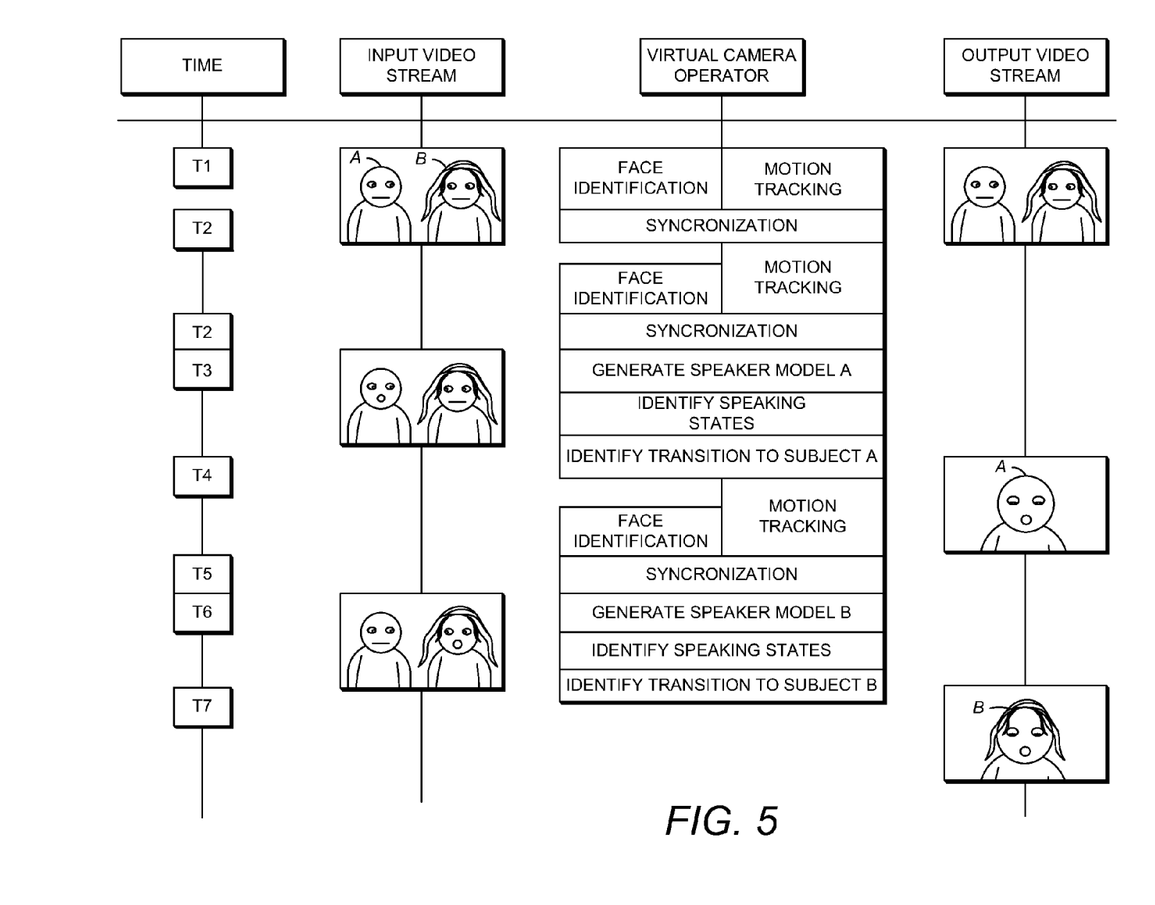
FIG. 5 is a diagram of a virtual camera operation for a video stream in accordance with an implementation of this disclosure.

FIG. 5 is a diagram of a virtual camera operation for a video stream in accordance with an implementation of this disclosure. For simplicity and clarity, FIG. 5 shows some elements of using virtual camera operation to generate an output video stream based on an input video stream over the course of a period of time T1-T7. In this example, the scene captured in the input video stream includes two participants, A and B. For example, participant A may be an interviewer and participant B may be an interviewee and the scene may include an interview between participant A and participant B.

At time T1, the input video stream 510 includes a scene including participant A and participant B. The virtual camera operator 520 receives the input video stream and generates facial identification, landmark, and motion tracking information as described above. The output video stream includes the scene, including both participants. At time T2, the virtual camera operator 520 generates facial identification and landmarking information and synchronizes the facial identification and landmarking information with the motion tracking information.

At time T3 participant A begins speaking. The virtual camera operator 520 generates a speaker model for participant A, identifies the speaking state of participant A as speaking, and identifies a transition from the current subject, including the scene, to a target subject, including an area around participant A. At time T4 the virtual camera operator 520 completes the transition to the target subject.

At time T5 virtual camera operator 520 continues generating motion tracking information, generates identification and landmarking information, and synchronizes the motion tracking information with the identification and landmarking information. Although elements of virtual camera operation are shown and described sequentially, the elements may be performed concurrently. For example, the virtual camera operator 520 may generate motion tracking information concurrently with generating a speaker model or transitioning from one subject to another.

At time T6 participant A stops speaking and participant B begins speaking. The virtual camera operator 520 generates a speaker model for participant B, identifies the speaking state of participant B as speaking, and identifies a transition from the current subject, including the participant A, to a target subject, including an area around participant B. At time T7 the virtual camera operator 520 completes the transition to the target subject, participant B.

Figure 6:
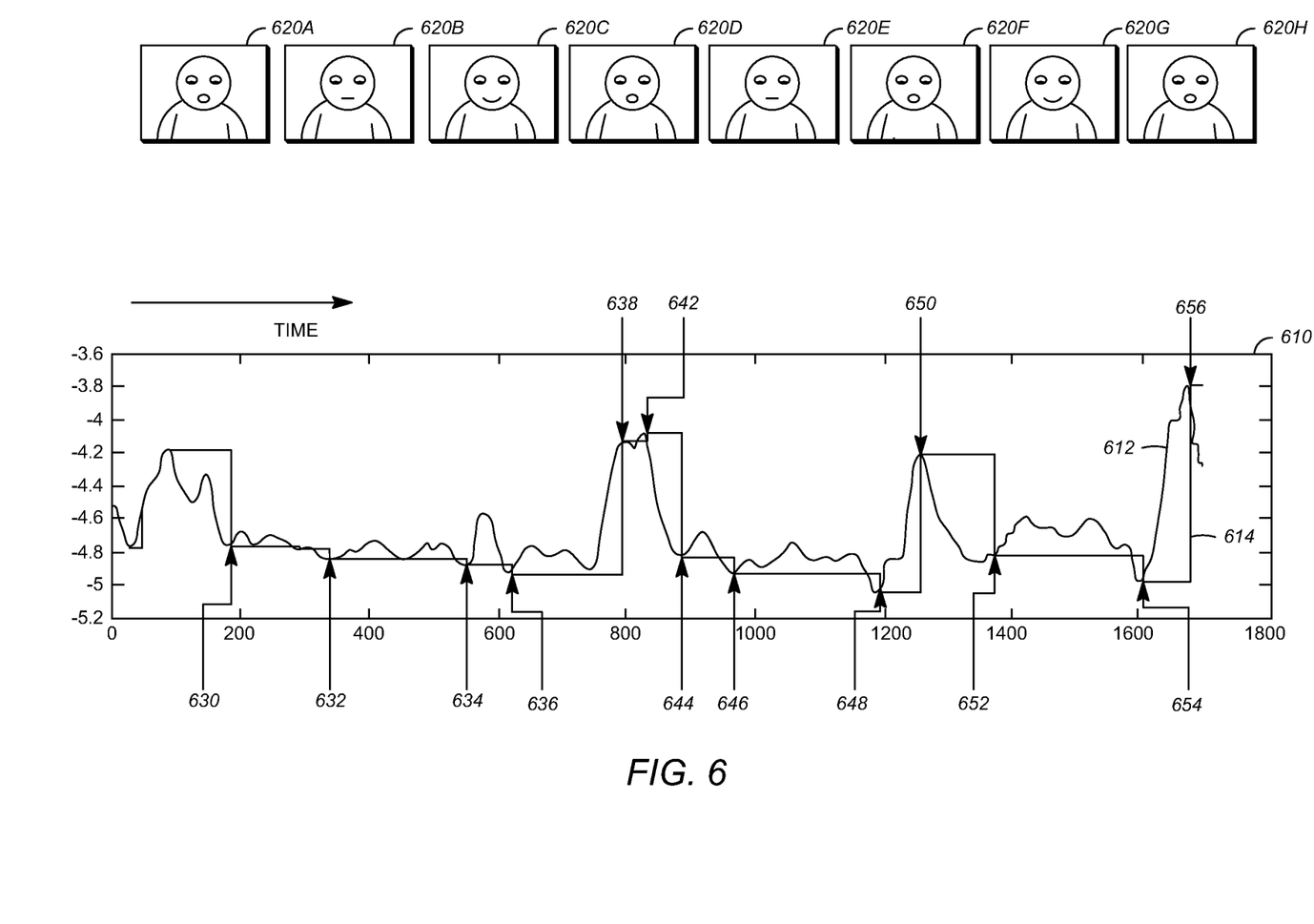
FIG. 6 is a diagram of target point identification for a participant for a video stream in accordance with an implementation of this disclosure.

FIG. 6 is a diagram of target point identification for a participant for a video stream in accordance with an implementation of this disclosure. FIG. 6 includes a chart 610 showing inter-frame motion values (as natural logarithm values) 612 and target point values 614 for a sequence of frames. The inter-frame motion values correspond approximately with representative images 620A-620H. The representative images 620A-620H are shown for clarity and do not correspond directly with any particular motion value or target point.

Moving from left to right, the inter-frame motion may indicate that the participant is speaking, as shown in representative image 620A. The participant may stop speaking, as shown in representative image 620B, and a local minimum target point 630 may be identified as the candidate target point. The inter-frame motion may decrease and local minimum target point 632 may be identified and used as the candidate target point. The inter-frame motion may decrease further and local minimum target point 634 may be identified and used as the candidate target point. The inter-frame motion may decrease again and local minimum target point 636 may be identified and used as the candidate target point. As shown in representative image 620C, the frames between local minimum target point 634 and local minimum target point 636 may indicate some motion that is not related to speech, such as a participant smiling.

As shown in representative image 620D, the participant may begin speaking Local maximum target point 638 may be identified, the candidate target point (636) may be identified as a relevant target point, and the local maximum target point may be used as the candidate target point. The inter-frame motion may increase and local maximum target point 642 may be identified and used as the candidate target point.

The participant may stop speaking, as shown in representative image 620E, local minimum target point 644 may be identified, the candidate target point (642) may be identified as a relevant target point, and local minimum target point 644 may be used as the candidate target point. The inter-frame motion may decrease and local minimum target point 646 may be identified and used as the candidate target point. The inter-frame motion may decrease further and local minimum target point 648 may be identified and used as the candidate target point.

As shown in representative image 620F, the participant may begin speaking Local maximum target point 650 may be identified, the candidate target point (648) may be identified as a relevant target point, and the local maximum target point 650 may be used as the candidate target point.

The inter-frame speech motion for the participant may decrease, as shown in representative image 620G, local minimum target point 652 may be identified, the candidate target point (650) may be identified as a relevant target point, and local minimum target point 652 may be used as the candidate target point. The inter-frame motion may decrease and local minimum target point 654 may be identified and used as the candidate target point.

As shown in representative image 620F, the inter-frame speech motion for the participant may increase. Local maximum target point 656 may be identified, the candidate target point (654) may be identified as a relevant target point, and the local maximum target point 656 may be used as the candidate target point.

Figure 7:
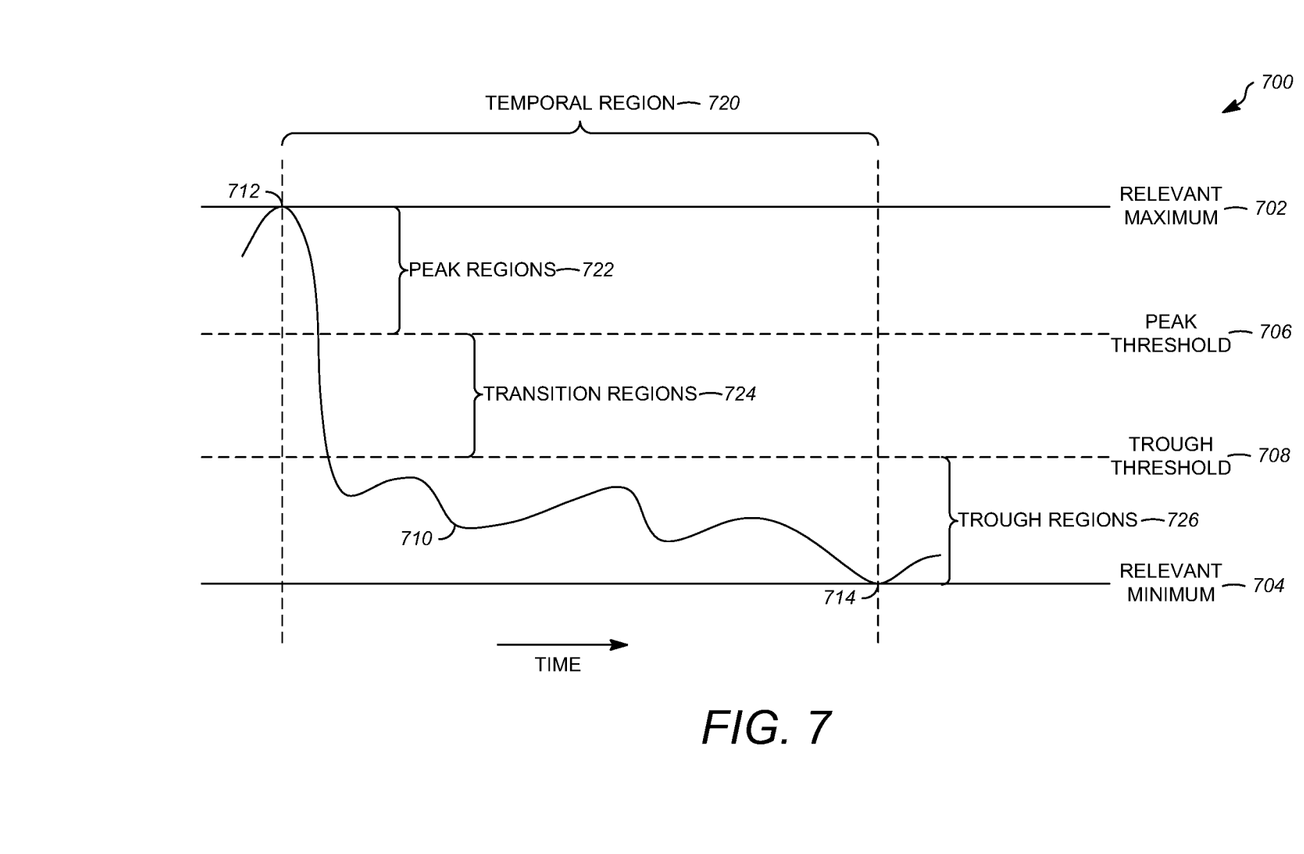
FIG. 7 is a diagram of segmentation for a participant for a video stream in accordance with an implementation of this disclosure.

FIG. 7 is a diagram of segmentation for a participant for a video stream in accordance with an implementation of this disclosure. FIG. 7 includes a chart 700 showing inter-frame motion values (as natural logarithm values) 710 for a participant in a temporal region 720 of a video stream, such as a sequence of frames.

The chart 700 includes a relevant maximum 702 corresponding to the relevant maximum target point 712 which may be the maximum value of the motion values 710 in the temporal region 720; and a relevant minimum 704 corresponding to the relevant minimum target point 714 which may be minimum value of the motion values 710 in the temporal region 720.

The chart 700 includes a peak threshold 706, which may be a proportion, such as 60%, of the difference between the relevant minimum target point 714 and the relevant maximum target point 712; and a trough threshold 708, may be a proportion, such as 40%, of the difference between the relevant minimum target point 714 and the relevant maximum target point 712. Although the peak threshold and target threshold are described as proportions of the difference between the relevant minimum target point and the relevant maximum target point, other method of identifying peak regions, transition regions, and trough regions may be used.

The segmentation may include identifying a peak region 722 including peak values, a transition region 724 including transition values, and a trough region 726 including trough values.

Although FIG. 7 shows a temporal region from a relevant maximum target point to a relevant minimum target point, segmentation may be performed for a temporal region from a relevant minimum target point to a relevant maximum target point.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using a device, such as the device 100 shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the device 100 shown in FIG. 1 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. As used herein, the term "processor" includes any of the foregoing hardware, either singly or in combination. The terms "signal", "information" and "data" are used interchangeably. Further, portions of the device 100 do not necessarily have to be implemented in the same manner. For example, the device 100 can be implemented using a general purpose computer or general purpose processor with a computer program that, when executed, carries out any of the respective methods, algorithms and/or instructions described herein. In addition or alternatively, for example, a special purpose computer/processor can be utilized which can contain specialized hardware, such as circuitry, for carrying out any of the methods, algorithms, or instructions described herein.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations, embodiments, and aspects have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of virtual camera operation, the method comprising:
   identifying a face of a participant in an input video stream;
   identifying a target region of the face in a first frame of the input video stream and in a second frame of the input video frame;
   generating speech motion data based on an inter-frame motion value determined from a first histogram, associated with a first frame, and a second histogram, associated with a second frame, the first histogram and the second histogram being based upon a gradient associated with each pixel, of a plurality of pixels, in the target region of the face in each of a first frame of the input video stream and a second frame of the input video stream;
   determining a speaking state of the participant in the input video stream based on the speech motion data;
   identifying a subject of the input video stream based on the speaking state; and
   generating, using a processor, an output video stream including a portion of the input video stream based on the subject.

2. The method of claim 1, wherein the portion of the input video stream is a first portion of the input video stream and the generating the output video stream includes generating a transition from a second portion of the input video stream to the first portion of the input video stream.

3. The method of claim 1, wherein the participant is a participant in a plurality of participants and the input video stream includes a scene that includes the plurality of participants, and wherein:
   the identifying the face includes identifying a plurality of faces wherein each face in the
   plurality of faces is associated with a respective participant in the plurality of participants;
   the determining the speaking state includes determining a plurality of speaking states wherein each speaking state in the plurality of speaking states is associated with a respective participant in the plurality of participants and a respective face in the plurality of faces; and the identifying the active region is based on the plurality of speaking states.

4. The method of claim 1, wherein the identifying the face includes generating a subsampled video stream based on the input video stream, the subsampled video stream having a resolution that is lower than a resolution of the input video stream.

5. The method of claim 1, wherein the identifying the face includes generating identification data, and generating motion tracking data.

6. The method of claim 5, wherein the generating the identification data includes generating landmarking data.

7. The method of claim 5, wherein the input video stream includes a plurality of frames and has a frame rate, and wherein the generating the identification data is performed at a frequency that is lower than the frame rate.

8. The method of claim 5, wherein the generating the motion tracking data includes using visual template tracking, optical-flow based feature tacking, or a combination of visual template tracking and optical-flow based feature tracking.

9. The method of claim 5, wherein the identifying the face includes synchronizing the identification data with the motion tracking data.

10. The method of claim 1, wherein the determining the speaking state includes:
    identifying speech motion data associated with the face; and
    generating a speaker model associated with the face.

11. The method of claim 10, wherein the generating the speaker model includes identifying a speaking state probability based on the speech motion data.

12. An apparatus for use in virtual camera operation, the apparatus comprising:
    a memory; and
    a processor configured to execute instructions stored in the memory to:
      identify a face of a participant in an input video stream;
      identify a target region of the face in a first frame of the input video stream and in a second frame of the input video frame;
      generate speech motion data based on an inter-frame motion value determined from a first histogram, associated with a first frame, and a second histogram, associated with a second frame, the first histogram and the second histogram being based upon a gradient associated with each pixel, of a plurality of pixels, in the target region of the face in each of a first frame of the input video stream and a second frame of the input video stream;
      determine a speaking state of the participant in the input video stream based on the speech motion data;
      identify a subject of the input video stream based on the speaking state; and generate an output video stream including a portion of the input video stream based on the subject.

13. The apparatus of claim 12, wherein the portion of the input video stream is a first portion of the input video stream and wherein the processor is configured to execute instructions stored in the memory to generate the output video stream by generating a transition from a second portion of the input video stream to the first portion of the input video stream.

14. The apparatus of claim 12, wherein the subject is a first subject and wherein the processor is configured to execute instructions stored in the memory to generate the output video stream by generating a transition from a second subject to the first subject.

15. The apparatus of claim 12, wherein the participant is a participant in a plurality of participants and the input video stream includes a scene that includes the plurality of participants, and wherein the processor is configured to execute instructions stored in the memory to:
   identify the face by identifying a plurality of faces wherein each face in the plurality of faces is associated with a respective participant in the plurality of participants;
   determine the speaking state by determining a plurality of speaking states wherein each speaking state in the plurality of speaking states is associated with a respective participant in the plurality of participants and a respective face in the plurality of faces; and
   identify the active region based on the plurality of speaking states.

16. The apparatus of claim 12, wherein the processor is configured to execute instructions stored in the memory to identify the face by generating a subsampled video stream based on the input video stream, the subsampled video stream having a resolution that is lower than a resolution of the input video stream.

17. The apparatus of claim 12, wherein the processor is configured to execute instructions stored in the memory to identify the face by generating identification data, and generating motion tracking data.

18. The apparatus of claim 17, wherein the processor is configured to execute instructions stored in the memory to generate the identification data by generating landmarking data.

19. The apparatus of claim 17, wherein the input video stream includes a plurality of frames and has a frame rate, and wherein the processor is configured to execute instructions stored in the memory to generate the identification data at a frequency that is lower than the frame rate.

20. The apparatus of claim 17, wherein the processor is configured to execute instructions stored in the memory to generate the motion tracking data using visual template tracking, optical-flow based feature tacking, or a combination of visual template tracking and optical-flow based feature tracking.

21. The apparatus of claim 17, wherein the processor is configured to execute instructions stored in the memory to identify the face by synchronizing the identification data with the motion tracking data.

22. The apparatus of claim 12, wherein the processor is configured to execute instructions stored in the memory to determine the speaking state by:
   identifying speech motion data associated with the face; and
   generating a speaker model associated with the face.

23. The apparatus of claim 22, wherein the processor is configured to execute instructions stored in the memory to generate the speaker model by identifying a speaking state probability based on the speech motion data.

24. The method of claim 1, wherein the subject is a first subject and the generating the output video stream includes generating a transition from a second subject to the first subject.

* * * * *